(12) United States Patent
Antonik et al.

(10) Patent No.: US 8,803,732 B2
(45) Date of Patent: Aug. 12, 2014

(54) METHOD AND APPARATUS FOR SIMULTANEOUS SYNTHETIC APERTURE RADAR AND MOVING TARGET INDICATION

(75) Inventors: Paul Antonik, Utica, NY (US); Michael C. Wicks, Utica, NY (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 392 days.

(21) Appl. No.: 13/385,468

(22) Filed: Jan. 11, 2012

(65) Prior Publication Data

US 2012/0146846 A1 Jun. 14, 2012

Related U.S. Application Data

(63) Continuation-in-part of application No. 12/456,269, filed on Jun. 5, 2009, now abandoned.

(51) Int. Cl.
| | |
|---|---|
| G01S 13/52 | (2006.01) |
| G01S 7/288 | (2006.01) |
| G01S 7/282 | (2006.01) |
| G01S 13/90 | (2006.01) |
| G01S 13/28 | (2006.01) |
| G01S 13/02 | (2006.01) |

(52) U.S. Cl.
CPC ............ *G01S 7/282* (2013.01); *G01S 7/288* (2013.01); *G01S 13/28* (2013.01); *G01S 2013/0245* (2013.01); *G01S 13/9029* (2013.01)
USPC .................................. 342/160; 342/25 R

(58) Field of Classification Search
CPC .................. G01S 13/9029–13/9035
USPC ........................................... 342/25, 160
See application file for complete search history.

(56) References Cited

U.S. PATENT DOCUMENTS

2009/0146869 A1* 6/2009 Dwelly et al. ................ 342/193

* cited by examiner

*Primary Examiner* — Timothy A Brainard
(74) *Attorney, Agent, or Firm* — Joseph A. Mancini

(57) ABSTRACT

Method and apparatus for simultaneous synthetic aperture radar and moving target detection. A plurality of independent radio frequency signals are generated and applied to separate radiating, receiving antenna elements. Signals are generated as basis functions, such that moving target detection and synthetic aperture radar signals are constructed from individual waveform components in space, time, frequency, and coding. Waveform components are sorted and combined at reception. Received data is simultaneously processed to extract synthetic aperture radar images and moving target indication detections.

18 Claims, 9 Drawing Sheets

METHOD AND APPARATUS FOR SIMULTANEOUS SYNTHETIC APERTURE RADAR AND MOVING TARGET INDICATION

CROSS-REFERENCE TO RELATED APPLICATIONS

The present application is a continuation-in-part application of and claims priority from related, co-pending, and commonly assigned U.S. patent application Ser. No. 12/456,269 filed on Jun. 5, 2009, now abandoned entitled "Method and Apparatus for Simultaneous Synthetic Aperture Radar and Moving Target Indication", by Paul Antonik and Michael C. Wicks. Accordingly, U.S. patent application Ser. No. 12/456,269 is herein incorporated by reference.

STATEMENT OF GOVERNMENT INTEREST

The invention described herein may be manufactured and used by or for the Government for governmental purposes without the payment of any royalty thereon.

BACKGROUND OF THE INVENTION

This invention relates generally to the field of radar. More specifically, the present invention relates to synthetic aperture radar and moving target indication modes of such radars.

Radar has been developed to provide detection, tracking, and imaging of objects in all weather conditions using electromagnetic signals. Moving target indication is a particular mode of radar in which stationary objects are separated from objects in motion. Typically, this is accomplished by passing successive radar returns through a subtraction circuit. The returns of objects which are not moving remain the same from pulse-to-pulse, resulting in their removal through the differencing process. On the other hand, the returns of moving objects vary in phase and amplitude on successive pulses, so that the returns of targets in motion are not cancelled.

The angular resolution of a radar beam is inversely related to the physical dimensions of the radar antenna. Moving target indication is typically employed for detection and tracking functions, which require only modest radar beamwidths. At the same time, large antennas are often required to provide sufficient gain. Multiple-channel phased array antennas were developed in part to provide a wide field-of-view concurrent with fine angular resolution.

The imaging function requires a higher degree of angular resolution than detection or tracking, and therefore requires a much larger antenna. The synthetic aperture radar technique was invented to produce long virtual apertures by translating a small physical aperture in space using the motion of the host platform. As the physical aperture is moved, the signals transmitted and received by the aperture are phase-shifted and added to produce a resultant sum that is similar to that of a larger physical aperture with many elements or subarrays. The virtual aperture is M times larger than the physical aperture, where M is the number of signals integrated, and results in a corresponding improvement in spatial resolution on the ground. In strip map mode, the antenna beam of the radar system remains in a fixed angular pointing direction, and an image of the surface is formed as the beam moves over the area to be imaged due to motion of the radar platform. In spotlight synthetic aperture radar, the direction of the beam pointing changes as the platform moves to keep the beam pointing at a fixed location on the ground. Multi-channel synthetic aperture radars have been developed using a phased array antenna and multiple receiver channels.

Besides different antenna provisions, synthetic aperture radar and moving target indication have conflicting waveform requirements. Synthetic aperture radar requires a wide beamwidth waveform, whereas moving target indication employs a relatively narrowband signal. The two functions also specify differing pulse repetition frequency requirements. These different demands require that synthetic aperture radar and moving target indication be performed either sequentially or using separate systems, although in some cases moving target indication information is derived from synthetic aperture radar images.

The multi-channel radio camera was invented to provide for array distortion correction in synthetic aperture and inverse synthetic aperture radar.

The frequency diverse array (see U.S. Pat. Nos. 7,319,427 and 7,511,665 B2) was invented to provide range dependent beamforming as well as control of adaptive transmit signals for the simultaneous use of radiated energy for multiple conflicting requirements.

A limitation of the prior art is that synthetic aperture radar requires a small aperture to provide a wide beam width to allow long integration times, whereas moving target indication requires large apertures for high gain, narrow beam widths, and low antenna sidelobes which aid in clutter suppression.

Another limitation of the prior art is that moving target indication implemented using synthetic aperture radar has been constrained to along-track interferometry, and to image change detection, which requires that images be formed prior to the detection of moving targets.

Still another limitation of the prior art is that spot light and strip map modes of synthetic aperture radar cannot be operated simultaneously.

Yet another limitation of the prior art is that synthetic aperture radar and real-beam moving target indication cannot be performed simultaneously.

Still yet another limitation of the prior art is that a congested radio frequency spectrum constricts contiguous bandwidth available for high resolution imaging.

OBJECTS AND SUMMARY OF THE INVENTION

The present invention provides a method and apparatus to produce synthetic aperture radar and moving target indication at the same time in a manner which overcomes all of the aforementioned limitations of the prior art. The invention utilizes independent waveform generation, timing, and control across multiple apertures in a phased array radar to provide simultaneous synthetic aperture radar and moving target indication, as well as aids to navigation and embedded communications. Waveform generation produces narrowband waveform building blocks, called sub-waveforms or basis functions. Different basis functions are radiated from different antennas or elements. This permits the simultaneous transmission of multiple waveforms at different frequencies, as opposed to sequential transmission of waveforms for varied functions.

On reception, signals are sorted by pulse, aperture, and frequency, and are arranged for the simultaneous processing for moving target indication and synthetic aperture radar imaging.

Moving target indication processing is applied at the building block level. An M-pulse Doppler processor is applied after M−1 two-pulse cancellers for each aperture. Doppler compensation is applied across apertures to scale for different frequencies for each spatial channel. Integration is then performed across apertures.

Wideband synthetic aperture radar waveforms are synthesized from the narrow band components across space and time utilizing interpolation and extrapolation. One monostatic and N−1 bistatic synthetic aperture radar images are formed for each of N channels. Integration is then performed across apertures and pulses.

The present invention therefore results in simultaneous moving target indication and synthetic aperture radar. The present invention also results in strip map and spotlight synthetic aperture at the same time. Alternative embodiments of the present invention provide for the simultaneous emission and processing of communications and navigation signals.

It is therefore an object of the present invention to provide an apparatus that overcomes the prior art's limitation of sequential moving target indication and synthetic aperture radar.

It is a further object of the present invention to provide an apparatus wherein spotlight and strip map synthetic aperture radar can be performed simultaneously through common equipment.

It is yet still a further object of the present invention to provide an apparatus wherein signals of multiple classes can be radiated and utilized at the same time, such as synthetic aperture radar signals simultaneously with ground moving target indication signals, or communications signals simultaneously with radar signals.

An additional object of the present invention is to overcome a fundamental limitation of conventional synthetic aperture radar, wherein a small aperture is required for long dwell and fine cross-range resolution.

Briefly stated, the present invention, method and apparatus for simultaneous synthetic aperture radar and moving target indication, achieves these and other objects through independent control of signals applied to radiating elements and through processing methods. A plurality of independent radio frequency signals are generated and applied to separate radiating/receiving antenna elements. Signals are generated as basis functions, such that moving target detection and synthetic aperture radar signals are constructed from individual waveform components in space, time, frequency, and coding. Waveform components are sorted and combined at reception. Received data is simultaneously processed to extract synthetic aperture radar images and moving target indication detections.

In the fundamental embodiment of the present invention, different waveform basis functions at different frequencies are applied to separate radiating elements, permitting the transmission of multiple signals at the same time. M pulses are transmitted from each channel, and the reflected signals from each transmission are received on all channels. Signals are reconstructed in a signal processor to perform multiple functions at the same time. For moving target indication, M−1 two-pulse cancellers are formed from M pulses at each aperture. In the preferred embodiment of the present invention, the signals at each aperture are at different frequencies, so that signals across apertures are scaled prior to Doppler filtering by $f_1/f_n$, where $f_1$ is the reference frequency and $f_n$ is the center frequency of the $n^{th}$ aperture. Phase compensation is also applied across apertures to account for waveform-to-waveform phase variation due to target complexity. Target phase information is quantized into $n_\phi$, steps, and a knowledge-based controller is used to select the appropriate phase. A sequential detector is formed across frequency bins. Integration across apertures is then performed to provide gain and beam width commensurate with the full array.

In an alternative embodiment, one monostatic and N−1 bistatic moving target indication processes are formed for each of N spatial channels. All $N^2$ moving target indication outputs are then combined to form a single output.

For synthetic aperture radar, a wideband signal is constructed from narrowband basis functions across multiple apertures. Interpolation and extrapolation algorithms are applied to a wide bandwidth signal over space and slow time, thus forming a real-time sequential imager. Each spatial channel also provides a conventional synthetic aperture radar, so that the full array provides a multiple-channel synthetic aperture radar capability. In an alternative embodiment, each spatial channel provides one monostatic and N−1 bistatic synthetic aperture radars, and the $N^2$ synthetic aperture radar outputs are then combined into a single integrated output.

According to an embodiment of the present invention, method and apparatus for simultaneous synthetic aperture radar and moving target indication comprises a radio frequency signal source, a series of multiplexers, a bank of amplifiers, a bank of phase shifters, an array of radiating elements, and a waveform control subsystem.

In contrast to prior art devices, the present invention produces synthetic aperture radar and moving target indication at the same time as well as spotlight and strip map modes of synthetic aperture radar at the same time. Nothing in the prior art teaches or suggests this feature of the present invention.

Therefore, it is accurate to say that the present invention (1.) can produce synthetic aperture radar and moving target indication at the same time, (2.) can produce strip map and spotlight modes of synthetic aperture radar at the same time, and (3.) provides a means to manage radar imaging bandwidth requirements in a congested radio frequency spectrum. As such, the present invention represents a significant improvement over prior art methods and apparatus.

The above, and other objects, features and advantages of the present invention will become apparent from the following description read in conjunction with the accompanying drawings, in which like reference numerals designate the same elements.

REFERENCES

1. J. P. Costas, "A study of a class of detection waveforms having nearly ideal range Doppler ambiguity properties". *Proc. IEEE*, vol. 72, no. 8, August 1984, pp. 96-1 009.
2. S. W. Golomb and H. Taylor, "Two-dimensional synchronization patterns for minimum ambiguity", *IEEE Trans. Info. Theory*, vol. IT-28, no. 4, July 1982, pp. 600-604.
3. H. Rohling, T. May, K. Brunmghau and R. Gruheid, "Broad-band OFDM radio transmission for multimedia applications", *Proc. IEEE*, vol. 87, no. 10, October 1999, pp. 1778-1789.
4. C. E. Cook and M. Bemfeld, Radar signals: an introduction to theory and application, New York, N.Y., Academic Press, 1967.
5. P. Van Etten and M. C. Wicks, "Unambiguous range-Doppler processing method and system". U.S. Pat. No. 5,657, 022. Aug. 12, 1997.
6. L. E. Brennan and I. S. Reed. "Theory of adaptive radar," *IEEE Trans. Aero. And Elect. Syst.*, vol. AES-9, March 1973. pp. 237-252.
7. M. I. Skolnik, Introduction to Radar Systems, 2nd Ed., McGraw-Hill Book Co., 1980.

DETAILED DESCRIPTION OF THE PREFERRED EMBODIMENT

Figure 1:
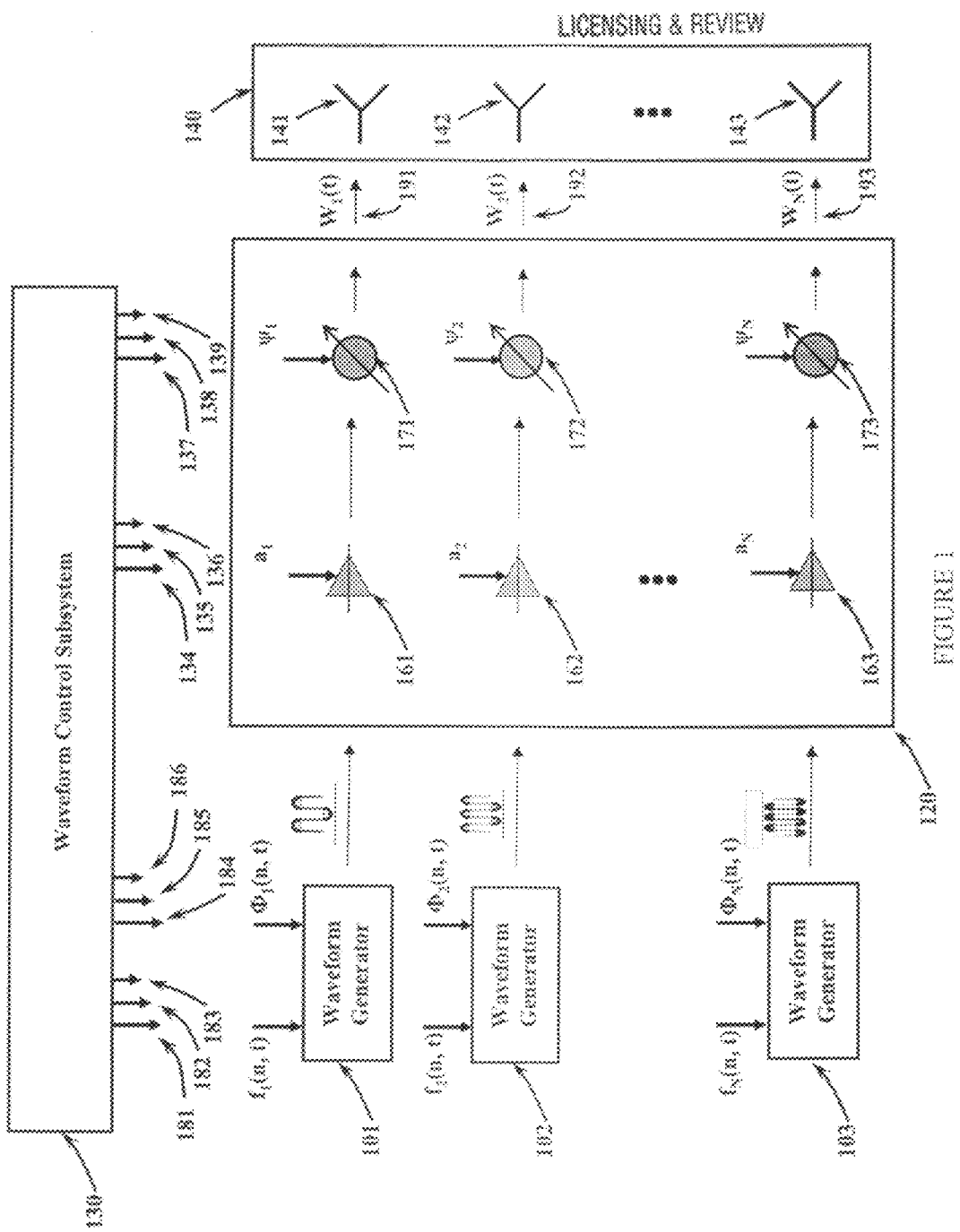
FIG. 1 is a schematic diagram representation of the present invention.

Referring to FIG. 1, the key components of a method and apparatus for simultaneous synthetic aperture radar and moving target indication include a plurality of waveform generators 101, 102, 103, a transmitter/receiver module 120, a waveform control subsystem 130, and a radiating element array 140.

A first, second through $n^{th}$ waveform generator 101, 102, 103 synthesize signals to be transmitted. The signals output from each of the waveform generators 101, 102, 103 are applied to a transmitter/receiver module 120. The waveform generators 101, 102, 103, the first, and second through $n^{th}$ inputs and outputs 191, 192, 193 of the transmitter/receiver module 120, and the first and second through $n^{th}$ antenna radiating/receiving elements 141, 142, 143 are interconnected such that any first, second, and $n^{th}$ waveform generator output can be applied to any and all first, second, through $n^{th}$ spatial channels. The outputs 191, 192, 193 of the transmit/receive module 120 are provided to a like plurality of antenna radiating/receiving elements 141, 142 through 143. A waveform control subsystem 130 provides frequency control signals 181, 182, 183 and first phase control signals 184, 185, 186 to the waveform generators 101, 102 through 103, respectively. The frequency and first phase control signals provide pulse-to-pulse and element-to-element frequency and phase diversity to the waveform generators as a function of time. It is readily appreciated by one skilled in the art that software control can provide for frequency and phase control signals applied to each waveform generator that may be independently varied or scaled both linearly and non-linearly with respect to time and, additionally, within the time between successive pulses. The waveform control subsystem 130 further provides a plurality of amplitude control signals 134, 135, 136 and second phase control signals 137, 138, 139 to each respective amplitude means 161, 162 and 163 and second phase control means 171, 172 and 173 of each channel, respectively, of the transmit/receive module 120. The amplitude control signals 134, 135, 136 permit power control, as well as a mechanism to apply amplitude weighting for antenna beam sidelobe control. The second phase control signals 137, 138, 139 introduce a radiating/receive element-to-radiating/receive element phase shift for electronic beam steering and phase compensation and correction. The frequency control signals 181, 182, 183 and the first phase control signals 184, 185, 186 permit the radiation of multiple signal modes at the same time.

Still referring to FIG. 1. a plurality of spatial channels is depicted. The actual number of transmitter/receiver module 120 signal outputs W1(t) ... WN(t) 191, 192 and 193 in the preferred embodiment depends upon the number of antenna elements 141, 142, and 143. It follows that the number of amplifiers 161, 162 and 163 and phase shifters 171, 172 and 173 will be identical to the number of antenna radiating-receiving elements 141, 142, and 143.

Figure 2:
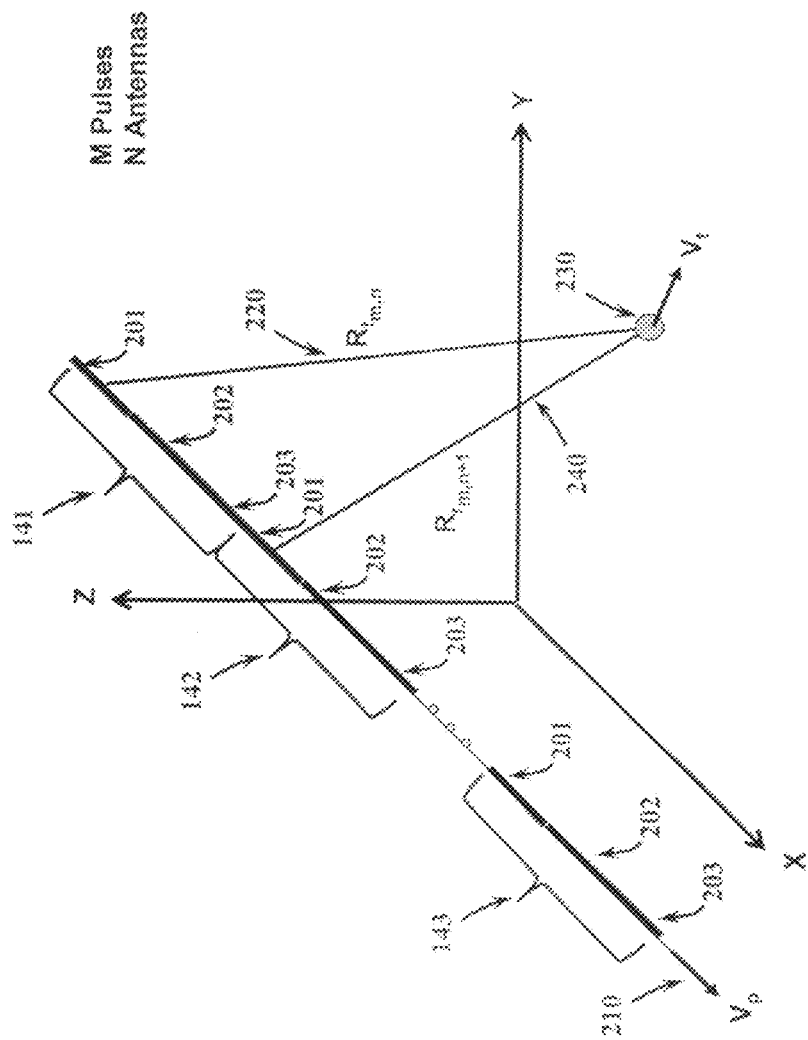
FIG. 2 is a graphical representation of a method of multi-channel space-time illumination for simultaneous synthetic aperture radar and moving target indication.

Referring now to FIG. 2 a method of multi-channel space-time illumination for simultaneous synthetic aperture radar and moving target indication is depicted. Signals from multiple radar pulses 201, 202, and 203 are radiated over time from each first, second through $n^{th}$ antenna radiating/receiving elements 141, 142, and 143 as the aperture translates due to platform motion (depicted as vector $V_P$) 210. The transmission 220 of the $m^{th}$ pulse from the $n^{th}$ antenna (denoted as $Rt_{m,n}$) is reflected from a target 230 on the ground, which may be moving. The reflected signals received at all spatial channels, thus forming one monostatic response and N−1 bistatic responses for each channel, where N refers to the number of antenna radiating/receiving elements. FIG. 2 shows the reflected signal (denoted as $Rr_{m,n+1}$) 240 for the $m^{th}$ pulse received at the $(n+1)^{th}$ element. In general, all waveforms are not identical for each spatial channel. Waveforms may be orthogonal, or nearly orthogonal to simplify signal separation on receive. Still referring to FIG. 2, the case where subarrays (spatial channels) are not overlapped and signals do not overlap in time is depicted. In general, subarrays and temporal signals may overlap.

Figure 3:
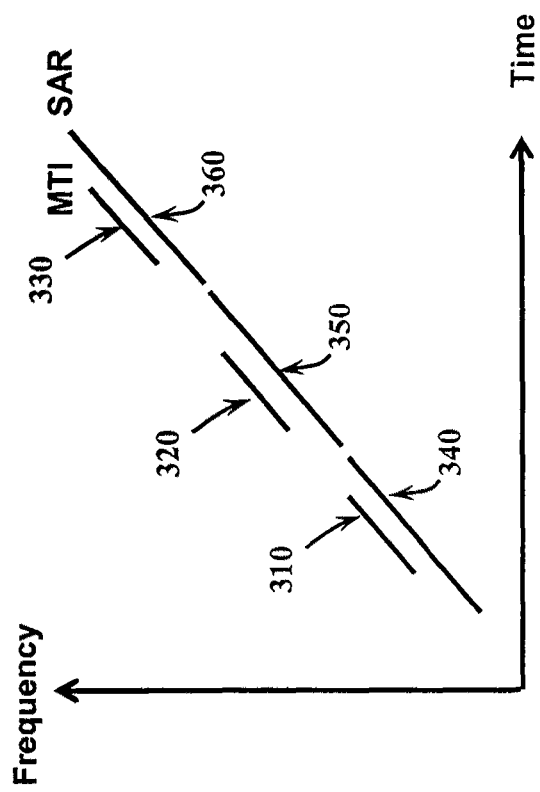
FIG. 3 is a graphical representation of frequency versus time across spatial channels for separate moving target indication and synthetic aperture radar illuminations.

Referring now to FIG. 3 methods of illumination are compared for separate moving target indication and synthetic aperture radar modes in frequency versus time. Moving target indication signals 310, 320, and 330 are radiated from antenna radiating/receiving elements 141, 142, and 143 (see FIG. 1, see also, FIG. 2) respectively and are relatively narrow band and short duration. Alternatively, synthetic aperture radar signals 340, 350, and 360 are radiated from antenna radiating/receiving elements 141, 142, and 143 and are relatively wide band and long duration. The moving target indication signals can be considered to be subsets of the synthetic aperture radar signals.

Figure 4:
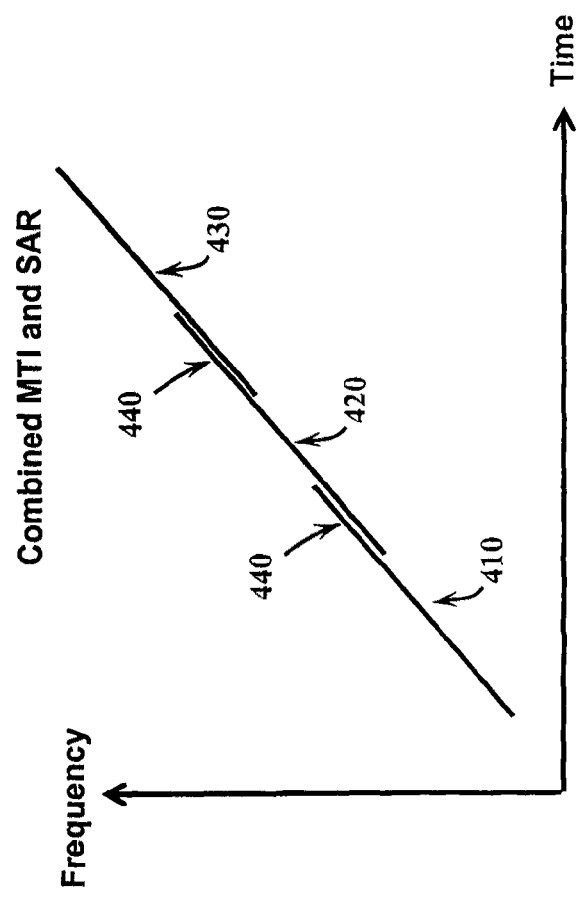
FIG. 4 is a graphical representation of frequency versus time across spatial channels for combined moving target indication and synthetic aperture radar.

Referring now to FIG. 4, a space-time illumination to achieve synthetic aperture radar and ground moving target indication at the same time is depicted in frequency versus time. Signals 410, 420, and 430 are radiated from elements 141, 142, and 143 respectively (see FIG. 1, see also, FIG. 2). In general, the signals radiated from multiple elements overlap in time 440, creating a phased array effect. In the prior art, synthetic aperture radar and ground moving target indication are inherently disparate processes. Synthetic aperture radar is an integration process which requires on the order of hundreds of megahertz of bandwidth to achieve sufficient range resolution for imaging. Ground moving target indication is a differencing process that requires only several megahertz of bandwidth for detection. The present invention permits modes to be constructed to support synthetic aperture radar and ground moving target indication at the same time by providing chirp diversity and phase modulation across the transmit/receive elements 141, 142 through 143 (see FIG. 1, see also, FIG. 2), and processing all elements in combination and individually.

Figure 5:
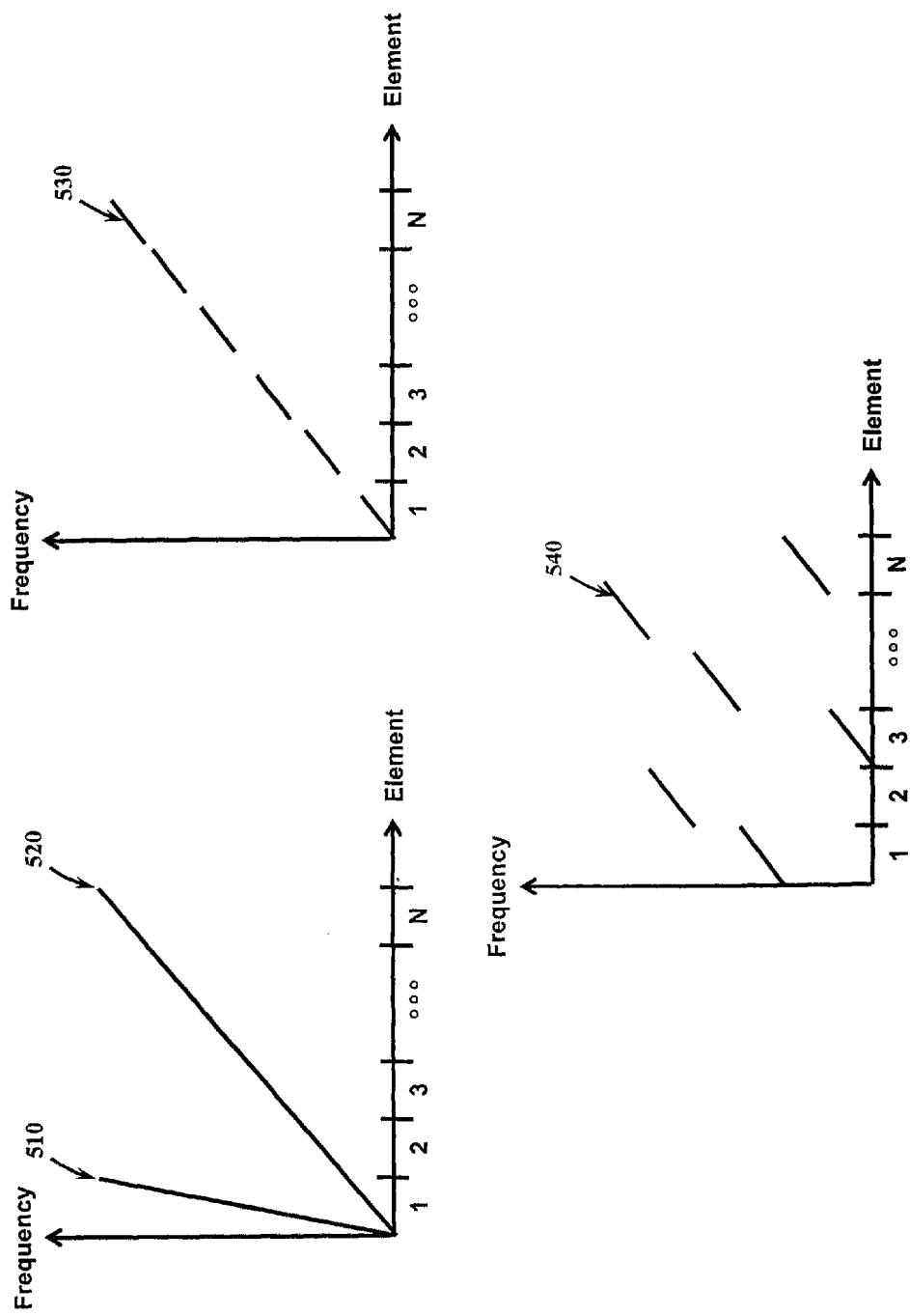
FIG. 5 is a graphical representation of various arrangements of frequency versus spatial channel for a synthetic aperture radar mode of the present invention, compared to illumination for conventional synthetic aperture radar.

Referring now to FIG. 5 methods of illumination are depicted for conventional 510 and sequential imaging 520 modes utilizing the present invention in a frequency versus number of radiating/receiving elements representation. In conventional synthetic aperture radar, a single radiating channel is used to radiate a wideband pulse. In the sequential imaging mode, portions of the full imaging signal or basis functions, are radiated from each spatial channel, and the full signal is reconstructed in the signal processor. It is not necessary for the signals from adjacent elements to be contiguous. Multi-element signal 530 is constructed from a plurality of basis functions, each containing a non-contiguous portion of the full bandwidth signal. Extrapolation and interpolation is utilized to determine full signal content. Any combination of signals provides the full transmitted signal. Signal 540 represents a highly non-contiguous set of sub-waveforms or basis functions, which sum to the same amalgamated signal 520.

Figure 6:
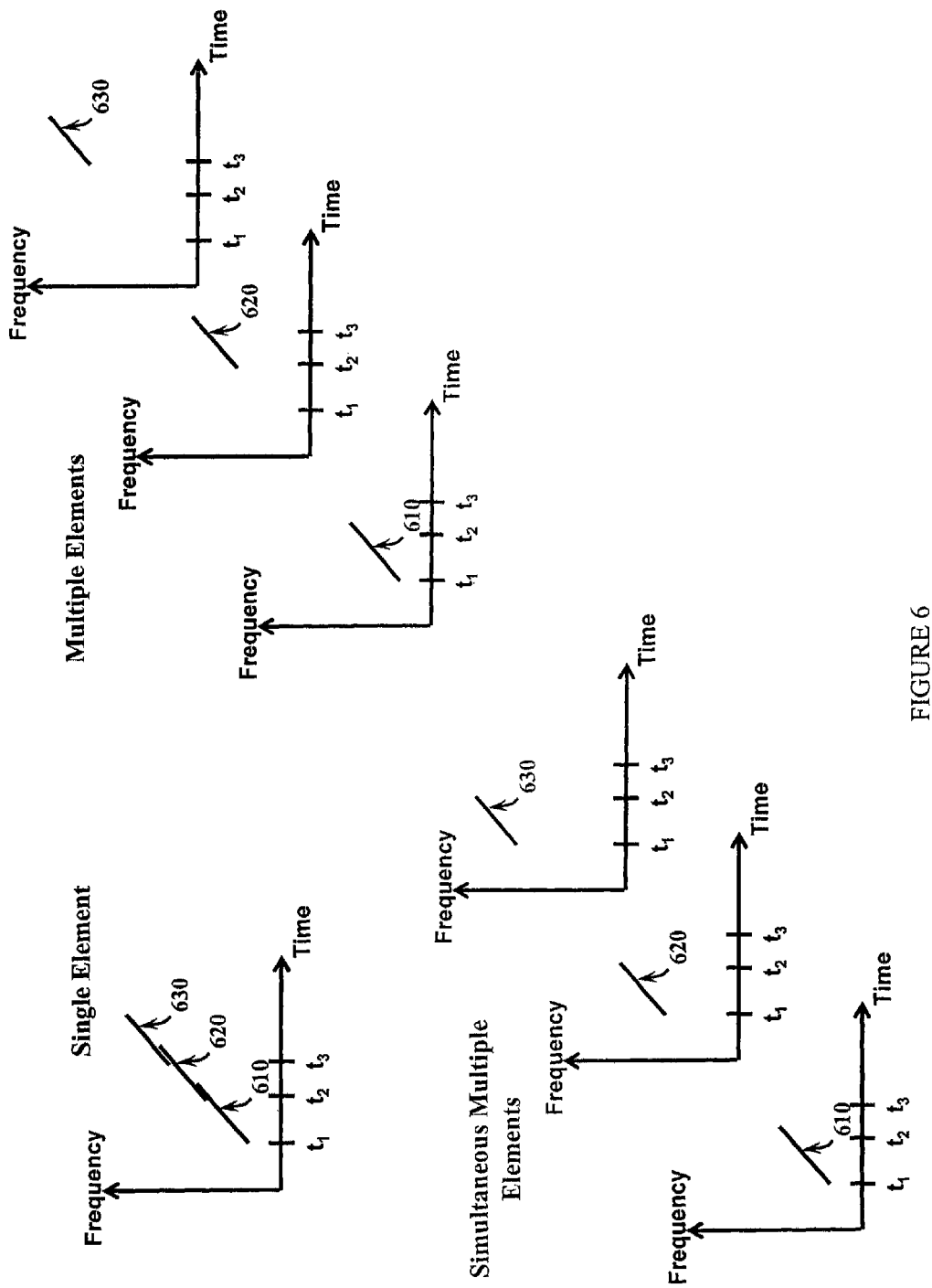
FIG. 6 is a graphical representation of various arrangements of frequency versus time and spatial channel for simultaneous synthetic aperture radar and moving target indication.

Referring now to FIG. 6, various methods of illumination are depicted for arranging combined moving target indication and synthetic aperture radar signals in a frequency, space, and time representation. Signals 610, 620, and 630 are different sub-waveforms radiated from a single radiating/receiving element 141 (see FIG. 1, see also. FIG. 2). Alternatively, signals 610, 620, and 630 are radiated separately from elements 141, 142, and 143 {see FIG. 1, see also, FIG. 2) respectively. Alternatively, signals 610, 620, and 630 are radiated from elements 141, 142, and 143 respectively at the same time.

The present invention (see FIG. 1) permits the generation and emission of separate sub-waveforms, including linear frequency modulation chirps or continuous wave tones, from each radiating element 141, 142, and 143. These sub-waveforms can be stored, sorted, and emitted in any sequence, including but not limited to being radiated in the order of low frequency to high frequency, high frequency to low frequency, or in a prescribed or pseudo-random fashion according to algorithms described in the literature, for example [1]-[3]. These radiated sub-waveforms reflect off of targets and return to the transmit/receive elements 141, 142, and 143. The received sub-waveforms collectively form an amalgamated waveform at each element, and are recorded and stored sequentially in time according to a first out, first basis.

Figure 7:
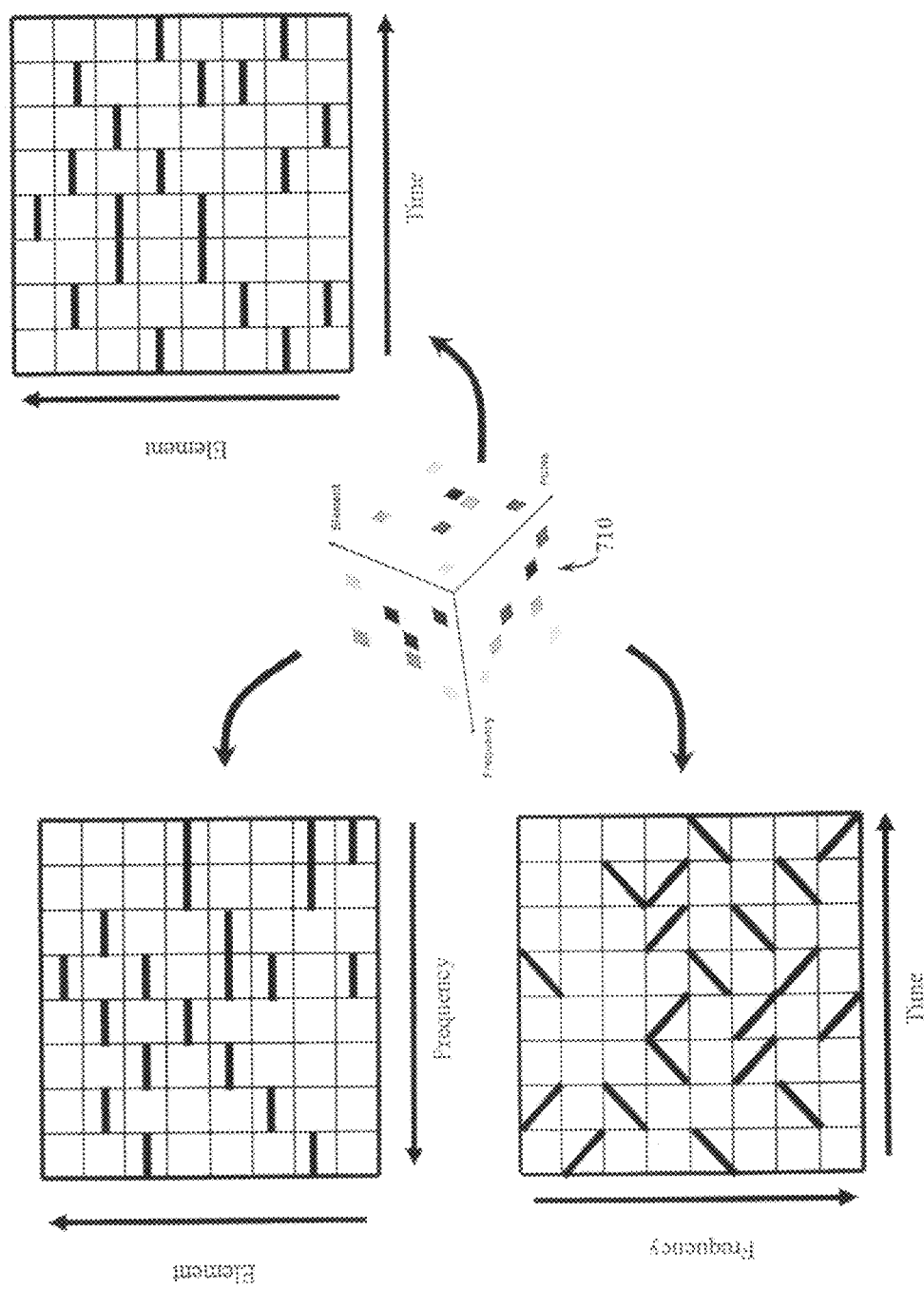
FIG. 7 is a graphical representation of arrangement of data from all pulses at all elements for processing for simultaneous synthetic aperture radar and moving target indication.

Referring now to FIG. 7, a generalized data cube 710 is depicted which is formed by enumerating the sub-waveforms or basis functions received and stored at all elements for all radar pulses. The received amalgamated waveform can be sorted by dividing it into pulses which correspond to the individual sub-waveform length or the period of the overall amalgamated waveform. The received sub-waveforms can be further sorted by frequency using prior knowledge of waveform generation, timing, and control of the transmitted signal, or by measurement using a frequency counter or spectrum analyzer. The received data cube, which is stored in a digital corner turn memory, is then processed simultaneously to extract moving target indication detection declarations and synthetic aperture radar images. The sub-waveforms stored in the data cube (see FIG. 7) can be rank ordered or sorted in terms of frequency to achieve a traditional swept frequency modulated signal. Traditional pulse compression methods, including stretch processing [4] for wideband waveforms, are then immediately available. Rank ordering provides simplicity in achieving Doppler tolerance against slightly varying slope chirp, such as through the method of VanEtten [5].

However, there is no requirement to rank-order the sub-waveforms, as a more general filter matched to the transmitted signal is also available a priori. The matched filter is well known as the convolution of the received signal with a time-reversed replica of the transmitted signal. Doppler tolerance can still be achieved by applying a frequency offset to each sub-waveform to match the Doppler frequency of the target or background environment, in effect, creating Doppler steering vectors. These Doppler steering vectors can be applied by weighting in time through frequency control signals 181, 182, 183, first phase control signals 184, 185, 186, and second phase control signals 137, 138, 139.

To achieve stripmap SAR imaging, distinct narrowband sub-waveforms are first radiated by each spatial channel, they are then reflected back from a target, and form a broadband amalgamated waveform which is received at every spatial channel. This arrangement enables the decoupling of antenna size from cross-range resolution, classically limited to d/2 in conventional SAR systems, where d is the aperture length along track, parallel to the aircraft velocity vector. The narrowband sub-waveforms are rank-ordered out of the data cube into a swept linear frequency modulated signal for wideband SAR beam sharpening at the element level. Alternatively, the returns from multiple elements can be summed to achieve integration gain against thermal noise or differenced to achieve along-track interferometric SAR.

Spotlight SAR, an alternative to stripmap SAR, functions by focusing on a small area on the surface of the earth. Selectivity in addressing radiating and receiving elements, spatial channels, phase and Doppler compensation in post-processing is key to achieving spotlight functionality from a SAR. Since spotlight SAR permits longer dwell times, improved cross-range resolution is possible with large apertures, at the expense of area coverage. Beam steering to keep the desired area on the surface of the earth illuminated is attained by applying a linearly varying phase shift across the selected aperture by means of phase control signals 171, 172, 173. A steering vector is similarly achieved on receive by applying an identical linearly varying phase shift in the form of weights applied to a discrete Fourier transform across selected spatial channels. The weights can provide adaptive beam forming by the application of a sampled matrix inversion process rather than a discrete Fourier transform [6]. By beamforming at the sub-waveform level and re-ordering, a constant broadband chirp waveform is attained for conventional pulse compression at each spot on the ground.

The present invention also permits simultaneous adjacent spotlight SAR images to be formed, thus enabling spotlight SAR resolution over a large area, which is also a limitation of, and not achievable by, conventional prior art approaches. The subject invention radiates unique sub-waveforms at the selected element level, resulting in the illumination of a large coverage area. By selectively addressing radiating elements, multiple beamforming outputs can be formed simultaneously, thus resulting in multiple spotlight SAR beams. On receive, because each element receives all energy radiated across the amalgamated waveform, selective post processing is critical to extracting data from just the spotlighted target area.

With regard to the present invention's ability to perform moving target indication (MTI), because MTI is an inherently narrowband process [7], the present invention sub-bands the amalgamated waveform into multiple narrowband signals. Since MTI is achieved on an individual sub-waveform basis, rank ordering is not required prior to clutter suppression and target enhancement.

The present invention achieves MTI functionality by selectively employing individual apertures and does not combine them as does conventional SAR. Beamforming is achieved through a linearly varying phase shift applied to selected apertures (as opposed to all apertures as in SAR) on transmit and application of a steering vector applied to selected apertures (as opposed to all apertures as in SAR) on receive as described earlier. Moving target indication on received signals using a SAR is obtained by the application of a multiple pulse canceller, which is in effect a form of MTI filter, to achieve high subclutter visibility. As a result, the selectivity applied to apertures on both transmit and receive result in the selectivity of MTI filtering as well. The broadband response can then be reconstituted from the post-MTI outputs. This can be performed post-detection for integration gain or pre-detection for high range resolution. Since the data is stored in digital memory, both methods can be applied simultaneously.

Figure 8:
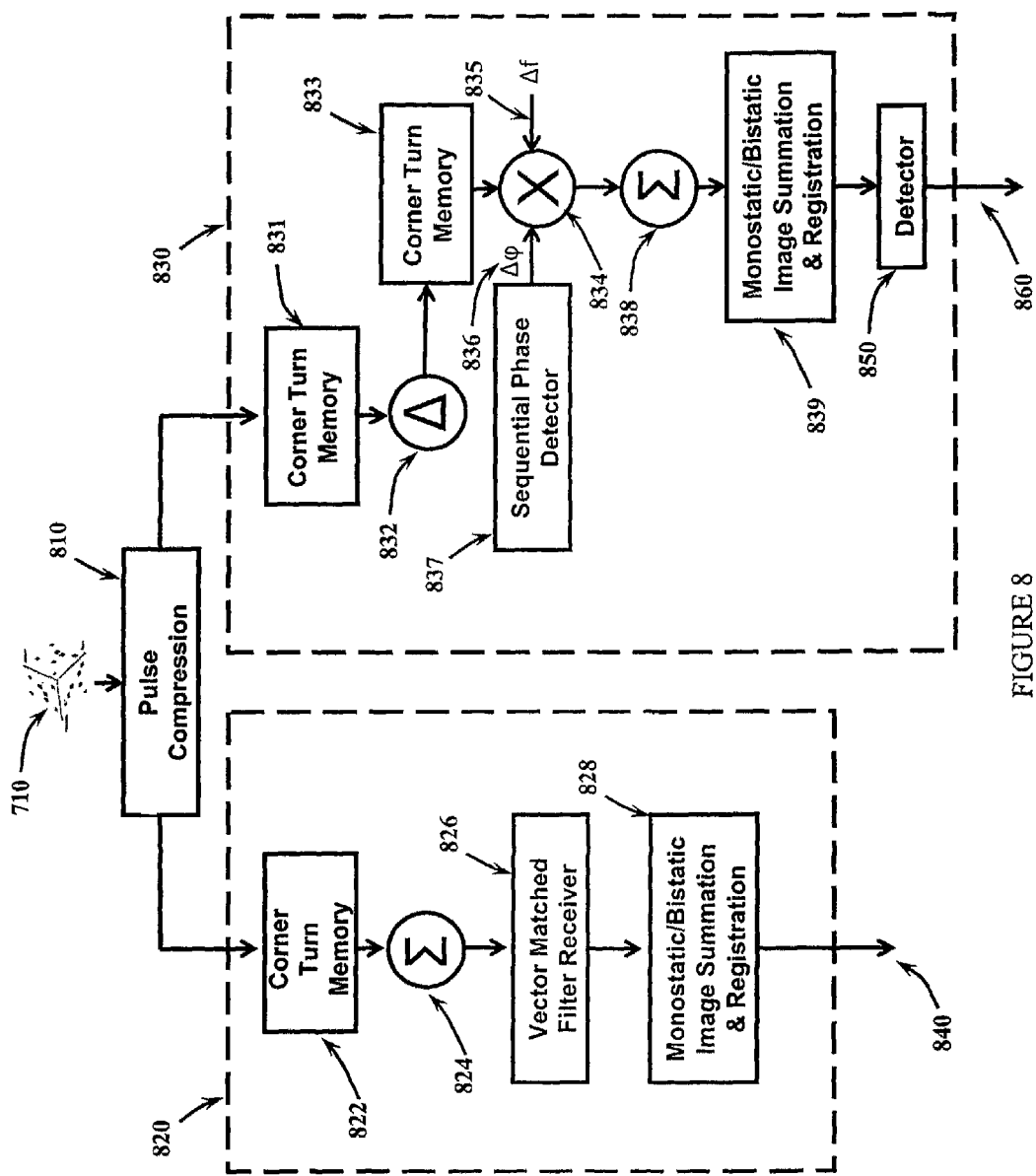
FIG. 8 is a schematic diagram representation of a method and apparatus for the processing of data for simultaneous synthetic aperture radar and moving target indication.

Referring now to FIG. 8, a method and apparatus is depicted for the simultaneous processing of received basis functions at all elements for synthetic aperture radar imaging and moving target indication. Generalized data cube 710 is input to pulse compression unit 810. Pulse compressed data is then passed simultaneously to the synthetic aperture radar processor 820 and moving target indication processor 830. The synthetic aperture radar processor first utilizes a corner turn memory 822 to arrange the input data by pulses. An accumulator 824 then sums (i.e., integrates) signals received from selected apertures and selected moving target filters. A vector matched filter receiver 826 is applied over all spatial channels, followed by a registration unit 828 to combine returns from all combinations of monostatic and bistatic pairs. However, the vector matched filter selectively filters data (i.e., compressed pulses) of interest from the corner turn memory. This selectively filtered data may also be selectively summed in an accumulator in a manner corresponding to the selected spatial channels (i.e., selected apertures and moving target filters) of interest. Image 840 is output from the synthetic aperture radar processor 820.

Still referring to FIG. 8, moving target indication processor 830 first utilizes corner turn memory 831 to arrange data, in data cube form, by pulses. The corner turn memory output is applied to a differencing unit 832, which contains M−1 two-pulse canceller circuits at each frequency, where M is the number of radar pulses. Corner turn memory 833 is utilized to arrange data by aperture or element. Multiplier 834 applies frequency 835 and phase 836 compensation signals. Frequency compensation signal 835 applies a frequency scale of Doppler components for each aperture. Doppler components are scaled by $f_1/f_n$, where $f_1$ is the reference frequency and $f_n$ is the carrier frequency of the $n^{th}$ element. Phase compensation signal 836 corrects phase variation across waveforms due to target complexity, and is generated by sequential phase detector 837. Doppler and phase compensated signals are then input to accumulator 838, which coherently integrates signals across apertures and moving target indication filters. Registration unit 839 combines returns from all combinations of monostatic/bistatic pairs. Detector 850 performs magnitude detection, threshold setting, and detection declaration. Detections 860 are output from the moving target indication processor 830.

Figure 9:
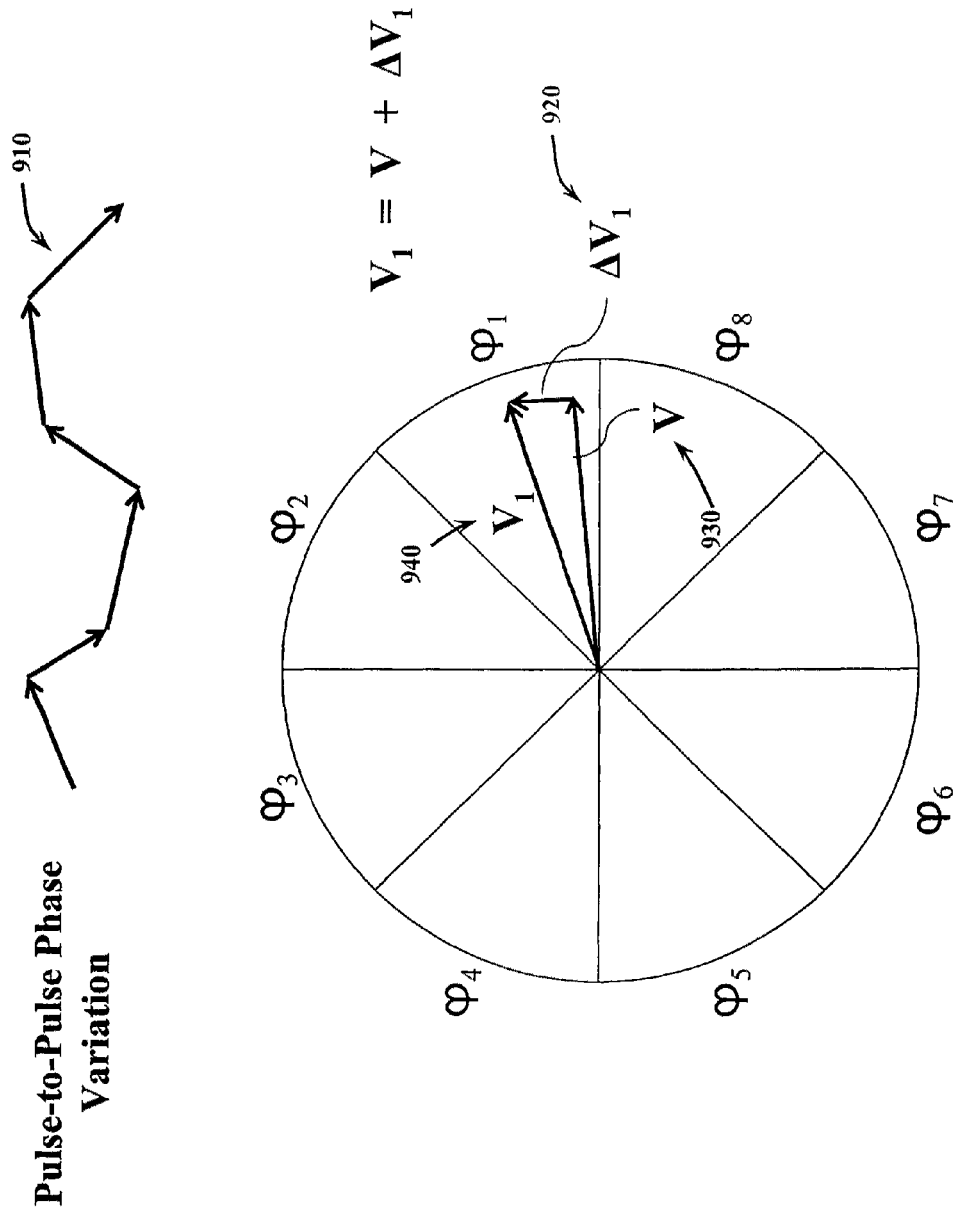
FIG. 9 is a graphical representation of a sequential phase detector.

Referring now to FIG. 9, operation of sequential phase detector 837 (see FIG. 8) is depicted. Target complexity and varying carrier frequency introduce a phase variation from waveform-to-waveform, which can be represented as a series of vectors 910. To achieve phase compensation prior to coherent integration across waveforms, an incremental vector $\Delta V_1$ 920 is added to received vector V 930 to achieve quantized phase $V_1$ 940. Phase is quantized into $N_\phi$ steps. Referring still to FIG. 9, eight steps are shown, although finer partitioning is possible. Phase quantization can be performed with the aid of a knowledge-based controller to account for known variation of frequency across waveforms.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. An apparatus for producing simultaneous synthetic aperture radar and moving target indication having a signal and data processor, wherein said signal and data processor further comprises:
    means for storing and sorting the folios ring so as to arrange data by pulses:
        radio frequency signals having been created by a plurality of waveform generators having transited a transmit/receive module, and having been emitted from a plurality of radiating/receiving elements as radio frequency pulses;
        said emitted radio frequency pulses; and
        received radio frequency pulses, being those said emitted radio frequency pulses reflected by the environment and received at said plurality of radiating/receiving elements;
    a pulse compression unit for compressing said received radio frequency pulses;
    a synthetic aperture radar processor for producing a synthetic radar image from data derived from said compressed pulses; and
    a moving target indicator processor for producing moving target indications from data derived from said compressed pulses.

2. The apparatus of claim 1, wherein said synthetic aperture radar processor further comprises:
    a first corner turn memory for storing and retrieving said data according to the sequencing of said compressed pulses;
    an accumulator for selectively summing only that said stored and retrieved data corresponding to selected said compressed pulses;
    a receiver for selectively vector match filtering only that said summed data which corresponds to selected spatial channels; and
    a registration unit for selectively summing only that said vector matched filtered data which corresponds to selected combinations of monostatically and bistatically received radio frequency pulses.

3. The apparatus of claim 2 wherein said moving target indicator processor further comprises:
    a second corner turn memory for storing and retrieving said data according to the sequencing of said compressed pulses;
    a differencing unit for performing pulse cancellation on said data;
    a third corner turn memory for storing and retrieving said data corresponding to only those selected apertures and radiating/receiving elements on which said pulses were received;
    a phase detector for generating a phase compensation signal for selectively correcting said data for phase variation;

a frequency compensation signal for selectively correcting said data for Doppler effects according to the apertures and radiating/receiving elements on which pulses corresponding to said data were received;

a multiplier for applying said phase compensation signal and said frequency compensation signal with said data output from said third corner turn memory;

an accumulator for integrating said data output from said multiplier over selected apertures and selected moving target indication filters;

a registration unit for combining data corresponding to selected combinations of monostatically and bistatically received radio frequency pulses; and a detector for performing:
  magnitude detection;
  threshold setting; and
  detection declaration.

4. The apparatus of claim 2, wherein said first corner turn memory further comprises a data cube.

5. The apparatus of claim 3, wherein said second and third corner turn memories each further comprises a data cube.

6. The apparatus of claim 4 or 5, said data comprises:
  selected frequency versus selected radiating/receiving element;
  selected radiating/receiving element versus selected time; and
  selected frequency versus selected time.

7. The apparatus of claim 3, wherein said phase detector for generating a phase compensation signal further comprises means for producing a quantized phase vector $V_1$ by adding an incremental phase vector $\Delta V_1$ to a received phase vector V.

8. A method for producing simultaneous synthetic aperture radar and moving target indication, comprising the step of extracting synthetic aperture image data and moving target indication data from received radio frequency signals, wherein said step of extracting further comprises the steps of:
  storing and sorting the following so as to arrange said data by pulses:
    radio frequency signals having been created by a plurality of waveform generators, each said signal having transited a transmit/receive module, and each said signal then having been emitted from a plurality of radiating/receiving elements into free space as radio frequency pulses;
    said emitted radio frequency pulses; and
    received radio frequency pulses from free space, being those said emitted radio frequency pulses reflected by the environment and received at said plurality of radiating/receiving elements;
  compressing said received radio frequency pulses;
  a first step of processing data derived from said compressed pulses so as to produce a synthetic radar image therefrom; and
  a second step of processing data derived from said compressed pulses so as to produce moving target indications therefrom.

9. The method of claim 8, wherein said first step of processing said data derived from said compressed pulses so as to produce a synthetic radar image further comprises the steps of:
  a first step of storing and retrieving said data wherein said first step comprises storing and retrieving said data according to the sequencing of said compressed pulses;
  a first step of selectively summing, wherein said first step comprises selectively summing only that said stored and retrieved data corresponding to selected said compressed pulses;
  selectively vector match filtering only that said summed data which corresponds to selected spatial channels; and
  a second step of selectively summing, wherein said second step comprises selectively summing only that said vector matched filtered data which corresponds to selected combinations of monostatically and bistatically received radio frequency pulses.

10. The method of claim 9, wherein said second step of processing data derived from said compressed pukes so as to produce moving target indications further comprises the steps of:
  a second step of storing and retrieving said data, wherein said second step comprises storing and retrieving said data according to the sequencing of said compressed pulses;
  performing pulse cancellation on said data;
  a third step of storing and retrieving said data wherein said third step comprises storing and retrieving said data corresponding to only those selected apertures and radiating/receiving elements on which said pulses were received;
  a first step of generating, wherein said first step comprises generating a phase compensation signal;
  a second step of generating, wherein said second step comprises generating a frequency compensation signal;
  a first step of selectively correcting said data, wherein said first step comprises selectively correcting said data for phase variation according to said phase compensation signal;
  a second step of selectively correcting said data, wherein said second step comprises selectively correcting said data for Doppler effects according to the apertures and radiating/receiving elements on which pulses corresponding to said data were received, and further according to said frequency compensation signal;
  integrating said phase and Doppler corrected data over selected apertures and selected moving target indication filters;
  combining said corrected data corresponding to selected combinations of monostaticatly and bistatically received radio frequency pulses;
  performing a detection of the following:
    magnitude detection;
    threshold setting; and
    declaring a moving target detection.

11. The method of claim 9, wherein said first step of storing and retrieving said data further comprises the steps of simultaneously storing and retrieving data sorted by:
  selected frequency versus selected radiating/receiving element;
  selected radiating/receiving element versus selected time; and
  selected frequency versus selected time.

12. The method of claim 10, wherein said second step of storing and retrieving said data further comprises the steps of simultaneously storing and retrieving data sorted by:
  selected frequency versus selected radiating/receiving element;
  selected radiating/receiving element versus selected time; and
  selected frequency versus selected time.

13. The method of claim 11 or 12, wherein said steps for simultaneously storing and retrieving data further comprise being sorted by coding.

14. The method of claim 10, wherein said step of generating a phase compensation signal further comprises computing a quantized phase vector $V_1$ by adding an incremental phase vector $\Delta V_1$ to a received phase vector V.

15. The method of claim 10, wherein said step of performing pulse cancellation on said data further comprises the step of performing a plurality of two-pulse cancellation operations for each said selected aperture on which pulses were received.

16. The method of claim 10, wherein said second step of processing further comprises the step of performing sequential phase detection.

17. The method of claim 16, wherein said step of sequential phase detection further comprises the step of quantizing said received pulse phase into an arbitrary number of discrete phase steps.

18. The method of claim 10, further comprising the step of combining said corrected data corresponding to selected combinations of monostatically and bistatically received radio frequency pulses prior to said step of magnitude detection.

* * * * *